May 20, 1924.

R. M. McGREW

COMPENSATOR

Filed Jan. 31, 1922

WITNESSES

INVENTOR
R. M. McGrew
BY
ATTORNEYS

May 20, 1924.                                                1,494,611
R. M. McGREW
COMPENSATOR
Filed Jan. 31 1922                  2 Sheets-Sheet 2
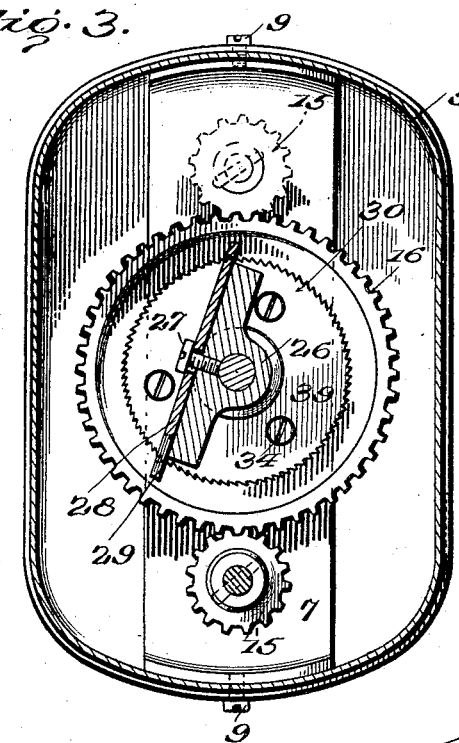
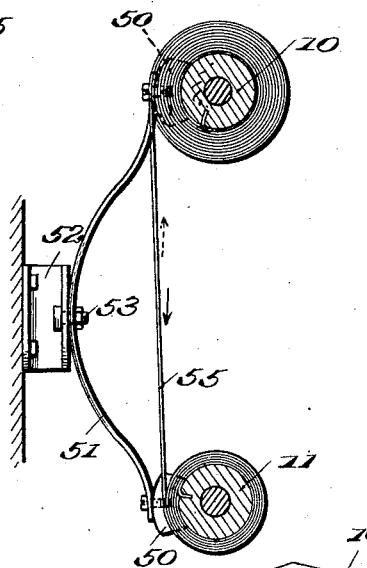
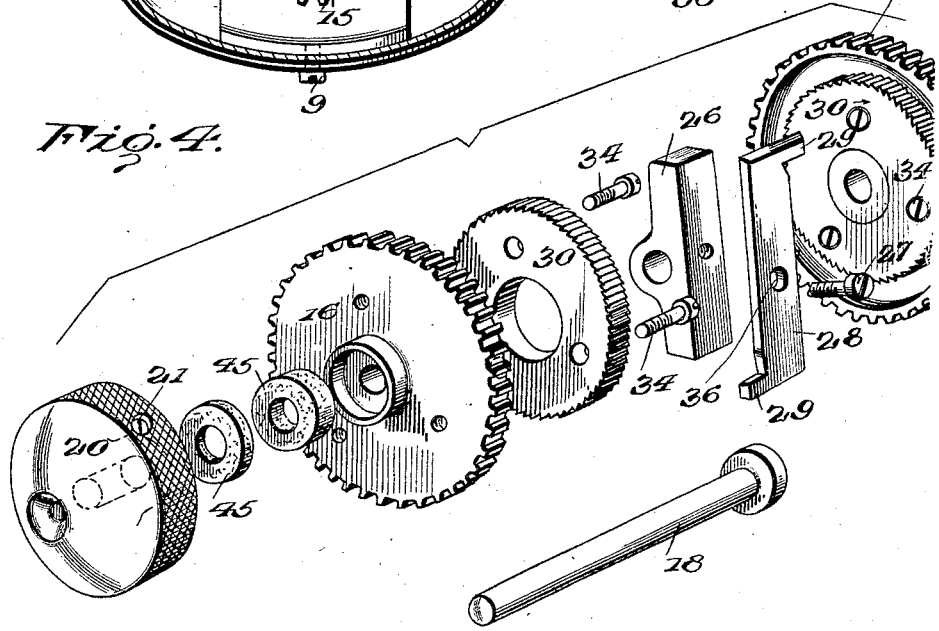
WITNESSES                                           INVENTOR
                                                 R. M. McGrew.
                                              BY
                                                    ATTORNEYS Patented May 20, 1924.

1,494,611

UNITED STATES PATENT OFFICE.

RICHARD M. McGREW, OF BUTTE, MONTANA.

COMPENSATOR.

Application filed January 31, 1922. Serial No. 533,139.

*To all whom it may concern:*

Be it known that I, RICHARD M. McGREW, a citizen of the United States, and resident of Butte, in the county of Silver Bow and State of Montana, have invented certain new and useful Improvements in Compensators, of which the following is a specification.

This invention relates to improvements in actuating mechanisms for chart rollers.

An important object of this invention is to provide novel means whereby a chart or the like may be transferred from one roller to another and returned to the original roller in such a manner that the difference in diameters of the two rolls is automatically compensated for.

Further the invention aims to provide a compensating mechanism for chart rollers which is operated entirely by the movement of one handle or knob and which when placed within the chart casing occupies but a small amount of space.

A further object is to provide a compensating mechanism which is sensitive in operation, of highly simplified construction and cheap to manufacture.

Other objects and advantages of the invention will be apparent during the course of the following description.

In the accompanying drawings forming a part of this application and in which like numerals are employed to designate like parts throughout the same, Figure 1 is a perspective of the improved compensating mechanism in use.

Figure 3 is a vertical transverse sectional view taken on line 3—3 of Figure 2.

Figure 4 is a group perspective of the compensating mechanism.

Figure 5 is a detail sectional view illustrating a brake employed for holding the sheet or chart taut.

Figure 1:
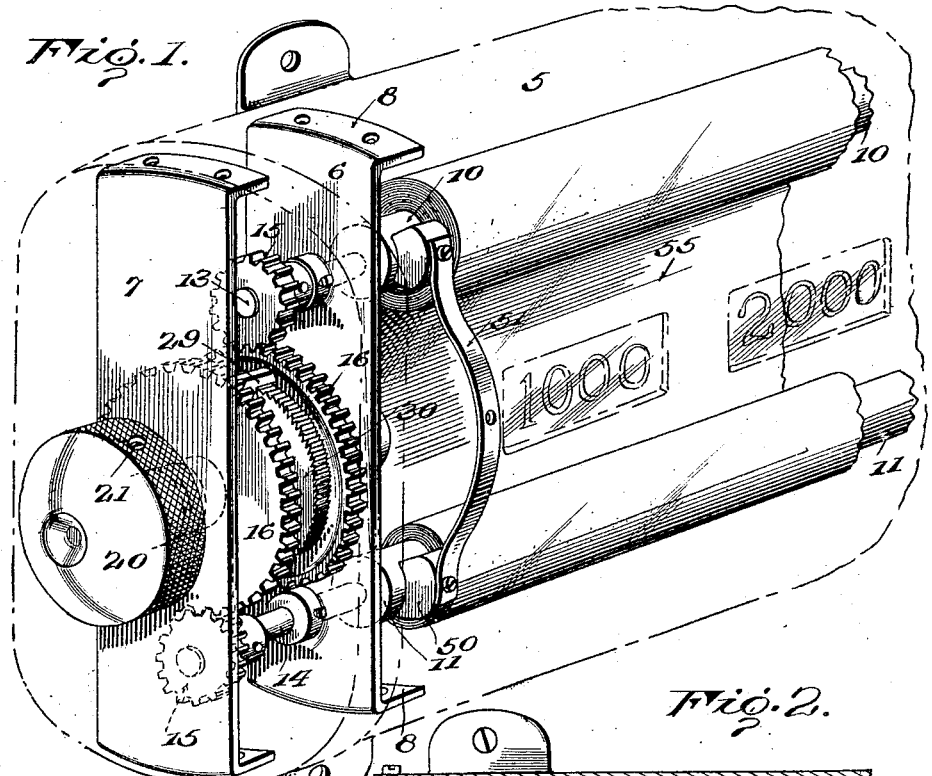

In the drawing the numeral 5 designates a casing which may be of any desired shape, size or construction and which is provided with supporting members 6 and 7, in the nature of lengths of metal having their end portions extended annularly to provide attaching flanges 8. The attaching flanges 8 are secured to the upper and lower sides of the casing by means of fastening devices 9 in the nature of screw bolts or the like. Upper and lower rollers 10 and 11 respectively have their ends provided with journals 13 and 14 rotatably extending through the supporting member 6 and provided with small gears 15 each one of which meshes with the corresponding gear 16 of the compensating mechanism.

Figure 2:
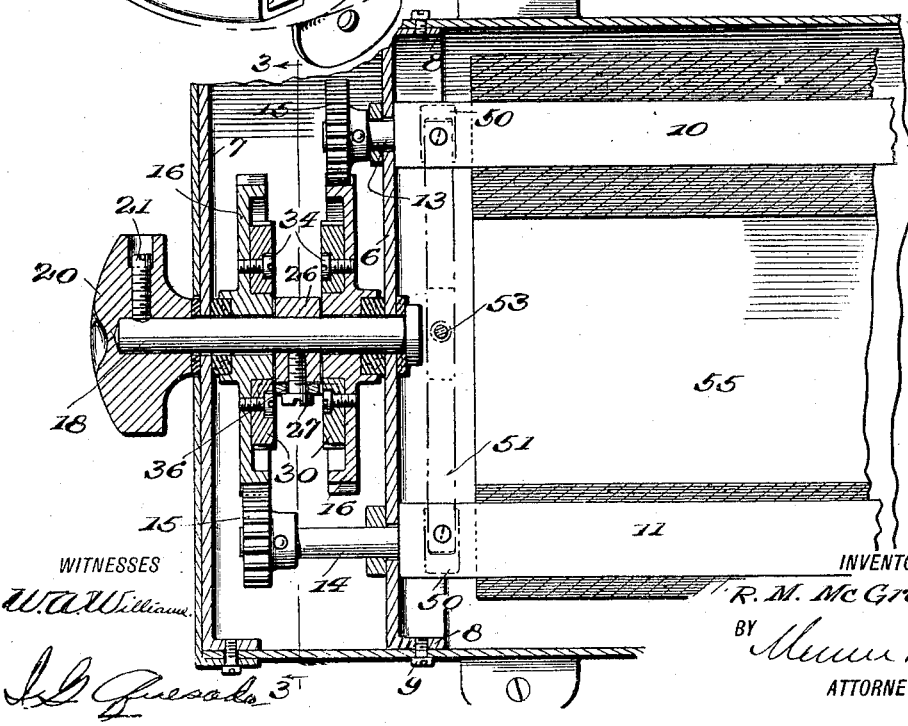
Figure 2 is a vertical sectional view through the compensating mechanism.

As illustrated in Figure 2 the gears 16 of which there are two are rotatably mounted upon the operating shaft 18 which is in turn rotatably extended through the supporting members 6 and 7 and has its extended terminal portion provided with a knob 20 by means of which the compensator may be operated for transferring the chart from one roller to the other. A set screw 21 is passed through one side of the knob and extends into the extended terminal portion of the shaft 18 whereby to detachably though securely connect the knob to the shaft.

The gears 16 of the compensating mechanism are arranged in spaced parallel relation on opposite sides of a cross plate 26 securely connected to the shaft by means of a screw bolt 27.

The cross plate 26 has its major portion arranged at one side of the shaft and extends for a substantial distance on opposite sides of the shaft to form a means to slidably support a pawl 28. The pawl 28 is in the nature of an elongated plate and has its ends provided with oppositely directed laterally projecting teeth 29, the inner edges of which are grooved for engagement with the teeth of annular ratchet wheels 30. The ratchet wheels 30 of which there are two are secured within annular recesses in the opposed sides of the gears 16 and are rigidly secured to the gears by means of screw bolts 34. With reference to Figure 4 it will be observed that the intermediate portion of the pawl 28 is provided with a longitudinally extending slot 36 which receives the shank of the screw bolt 27. The head of the screw bolt 27 does not bear hard against the pawl 28 and consequently the pawl may move longitudinally on the cross plate 26 so that either one of the teeth 29 may be engaged with the corresponding ratchet wheel.

Suitable washers 45 are mounted on the shaft 18 and are arranged between the various parts of the compensating mechanism so as to reduce the wear and friction to a minimum.

As illustrated in Figures 1 and 5 the brake shoes 50 are engaged with the upper and lower rollers and are urged to their operative positions by means of a longitudinally curved leaf spring 51 anchored to the casing by means of a bracket 52 and a fastening device 53. It will be seen that the brake shoes 50 hold the sheet 55 taut during the transfer of the sheets from one roller to the other.

In operation when the knob 20 is rotated in one direction the pawl 28 is moved longitudinally by the rotation of the shaft and consequently one of the teeth 29 are engaged with the corresponding ratchet wheel so that only one of the gears 16 is rotated. The rotation of this one gear causes one of the chart rollers to be operated so that the sheet is rolled onto that roller from the other roller. However, when the pawl is moved longitudinally one of the teeth 29 is moved to an inoperative position or out of engagement with the corresponding ratchet wheel. This renders one of the gears 16 inoperative so that the roller associated with that gear is not turned for winding the sheet thereon.

As the only roller which turns is the one onto which the sheet is being wound the difference in the diameters of the rolls is automatically compensated for and no slack or excessive tautness occurs at any time.

The improved compensator occupies but a small amount of space within the casing and due to the arrangement of the parts a highly accurate movement is provided. The device requires no attention as the pawl 28 is operated more or less automatically for operating only one of the rollers.

Having thus described the invention, what is claimed is:—

1. A mechanism of the character described comprising a shaft having means whereby the same may be rotated in either direction, ratchet wheels mounted on said shaft, a pawl carried by and movable transversely of said shaft, each end of the pawl being formed with a tooth overlying and adapted to separately engage one of said ratchet wheels, and a member secured to said shaft and slidably supporting said pawl.

2. A mechanism of the character described comprising a shaft having means whereby the same may be rotated in either direction, ratchet wheels mounted on said shaft, a pawl carried by and movable transversely of said shaft, each end of the pawl being formed with a tooth overlying and adapted to separately engage one of said ratchet wheels, a member secured to said shaft and slidably supporting said pawl, and means whereby to limit the sliding movement of said pawl transversely of said shaft.

3. A compensating mechanism comprising a shaft, a pair of power transmitting gears mounted thereon, a pawl slidable with relation to the shaft and having means to establish a driving connection between the shaft and the gears, and a cross plate carried by said shaft between said gears for slidably supporting said pawl.

4. A compensating device comprising a shaft having means whereby the same may be rotated, a pair of gears mounted thereon and adapted for operation in opposite directions, a pawl extending transversely of said shaft and having means whereby the same may be moved longitudinally, and ratchet wheels associated with said gears, said pawl being provided with teeth adapted to separately engage said ratchet wheels.

5. A compensating device comprising a shaft having means whereby the same may be rotated, a pair of gears mounted thereon and adapted for operation in opposite directions, a pawl extending transversely of said shaft and having means whereby the same may be moved longitudinally, ratchet wheels associated with said gears, said pawl being provided at its ends with teeth adapted to separately engage said ratchet wheels.

6. A compensating mechanism comprising a shaft, a pair of spaced gears mounted thereon, a cross plate mounted on said shaft between said gears and extended for substantial distances beyond the sides of said shaft, a pawl mounted on said cross plate and having its ends provided with oppositely directed teeth, a screw bolt securing said cross plate to said shaft and extended through said pawl, whereby to slidably connect the same to said cross plate, the opposed sides of said gears being provided with recesses, ratchet wheels received within said recesses and securely connected to said gears, said ratchet wheels being provided with teeth adapted to be engaged by the teeth of said pawl, and a knob secured on said shaft.

RICHARD M. McGREW.